US007698285B2

(12) United States Patent
Grosset et al.

(10) Patent No.: US 7,698,285 B2
(45) Date of Patent: Apr. 13, 2010

(54) COMPRESSION OF MULTIDIMENSIONAL DATASETS

(75) Inventors: Robin Grosset, Ottawa (CA); David Hood, London (GB)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 11/558,305

(22) Filed: Nov. 9, 2006

(65) Prior Publication Data
US 2008/0114793 A1 May 15, 2008

(51) Int. Cl.
*G06F 17/30* (2006.01)
*G06F 7/00* (2006.01)
*G06F 17/00* (2006.01)

(52) U.S. Cl. ............... 707/100; 707/1; 707/3; 707/101; 707/102; 707/104.1

(58) Field of Classification Search ........ 707/101, 707/100, 102, 104.1, 1, 3
See application file for complete search history.

(56) References Cited

U.S. PATENT DOCUMENTS

| 6,823,329 B2* | 11/2004 | Kirk et al. ............ 707/2 |
| 6,941,287 B1* | 9/2005 | Vaidyanathan et al. ..... 706/12 |
| 2004/0133541 A1* | 7/2004 | Meredith et al. ......... 707/1 |
| 2004/0254930 A1 | 12/2004 | Acharya |
| 2005/0192996 A1* | 9/2005 | Tarin ................ 707/102 |
| 2005/0262108 A1* | 11/2005 | Gupta ................ 707/100 |
| 2007/0247350 A1* | 10/2007 | Ryan ................ 342/65 |
| 2008/0016023 A1* | 1/2008 | Aspinall ............. 707/1 |

OTHER PUBLICATIONS

Rhodes et al. "Locally Optimized Run-Length Compression Applied to CT Images." © 1985 IEEE. 7 pages.*
International Search Report and Written Opinion from corresponding PCT Application Serial No. PCT/US07/22821 dated Apr. 23, 2008 (8 pages).
International Preliminary Report on Patentability from corresponding PCT Application Serial No. PCT/US2007/022821 mailed May 22, 2009 (7 pages).

* cited by examiner

*Primary Examiner*—Apu M Mofiz
*Assistant Examiner*—Charlew E Lu
(74) *Attorney, Agent, or Firm*—Shumaker & Sieffert, P.A.

(57) ABSTRACT

Techniques are described for compressing multidimensional datasets. For instance, a compression module obtains lists of indices of data along dimensions of the multidimensional dataset. The compression module calculates lists of offset values from the lists of coordinates. The compression module then performs a statistical redundancy data compression algorithm on the lists of offset values. Because the lists of offset values may contain more repetitious values than the initial lists of coordinates, a compression ratio on the multidimensional dataset may be higher than without first calculating the lists of offset values.

16 Claims, 5 Drawing Sheets

COMPRESSION OF MULTIDIMENSIONAL DATASETS

TECHNICAL FIELD

The invention relates to compression of computer data.

BACKGROUND

Enterprise software systems are typically, sophisticated, large-scale systems that support many, e.g., hundreds or thousands, of concurrent users. Examples of enterprise software systems include inventory management systems, budget planning systems, order management systems, inventory management systems, sales force management systems, business intelligent tools, enterprise reporting tools, project and resource management systems, and other enterprise software systems.

A computing device for a user typically connects to the enterprise software system via a computing network. Typically, the user computing device includes a cache to store datasets requested by the user. The user computing device may provide an operating environment for concurrent execution of multiple planning applications that access the datasets stored to the cache. In many cases the cache stores complex, multi-dimensional datasets, i.e., data cubes, which the user computing device may download from the enterprise software system via the network connection.

Frequently, the planning applications perform operations that require access to a subset of the data within the multidimensional datasets. To perform these operations, the computing device may create and maintain additional multi-dimensional datasets within the cache to temporarily hold the subset of the data being manipulated. The additional datasets consume additional memory resources and require synchronization so as to maintain consistency with the original datasets. These data synchronization techniques may present significant overhead, which may further delay execution of the operations.

SUMMARY

In general, the invention is directed to techniques for compressing multidimensional datasets. For instance, a compression module may identify lists of coordinates for data elements within a multidimensional dataset. The compression module may then calculate lists of offset values from the lists of coordinates. The compression module may then perform a statistical redundancy data compression algorithm on the lists of offset values. Because the lists of offset values may contain more repetitious values than the initial lists of coordinates, a compression ratio on the multidimensional dataset may be higher than without first calculating the lists of offset values.

For example, a server may include a database that contains a multidimensional dataset. The multidimensional dataset may have, for example, an x-dimension, a y-dimension, and a z-dimension. Each of the dimensions may have a numerical index. For instance, if the z-dimension is time, the numerical index may represent days (e.g., Day 1, Day 2, and so on.) In response to a query from a user for a subset of the multidimensional dataset, the server may generate a resulting subset of the multidimensional dataset. Because the resulting subset of the multidimensional dataset may still be very large, a compression module on the server may compress the resulting subset of the multidimensional dataset. To compress the resulting subset of the multidimensional dataset, the compression module identifies a list of index values for each dimension of the result set. Each index value in one of the lists represents a location in the dimension that contains a data value. For instance, if there is a data value in the result set at Days 1 through 5, but not 6 and 7, the list of index values for the time dimension includes "1" through "5", but not "6" or "7".

After obtaining the lists of index values for each of the dimensions, the compression module calculates the offsets between each index value in each of the lists. Continuing the previous example, the offset between each of Days 1 through 5 is "1". Hence, the resulting list of offset values for the z-dimension may be $\{1, 1, 1, 1, 1\}$. After calculating all of the offsets, the compression module may perform a statistical redundancy data compression algorithm on the offsets to compress the offsets into a compressed dataset. The server may then transmit the compressed dataset to the client.

In one embodiment, a method comprises identifying sets of index values, each of which contains index values for a dimension of a multidimensional dataset. Each of the index values identifies a position along a dimension of the multidimensional dataset at which a data value exists in the multidimensional dataset. The index values in the sets of index values are organized in an order. The method also comprises calculating sets of offset values that contain offset values for respective ones of the sets of index values. Each of the offset values represents a difference between a current index value in one of the sets of index values and a preceding index value in the set of index values. The preceding index value immediately precedes the current index value according to the order of the set of index values, if such immediately preceding index value exists. In addition, the method includes applying a lossless compression algorithm to the sets of offset values to generate a compressed version of the multidimensional dataset. The method also includes outputting the compressed version of the multidimensional dataset.

In another embodiment, a network device comprises a compression module to output a compressed version of a multidimensional dataset by identifying sets of index values, calculating sets of offset values for respective ones of the sets of index values, and applying a lossless compression algorithm to the sets of offset values. Each of which contains index values for a dimension of a multidimensional dataset. Each of the index values identifies a position along a dimension of the multidimensional dataset at which a data value exists in the multidimensional dataset. The index values in the sets of index values are organized in an order. Each of the offset values represents a difference between a current index value in one of the sets of index values and a preceding index value in the set of index values. The preceding index value immediately precedes the current index value according to the order of the set of index values, if such immediately preceding index value exists.

In another embodiment, a computer-readable medium comprises instructions. The instructions cause a programmable processor to identify sets of index values, each of which contains index values for a dimension of a multidimensional dataset. Each of the index values identifies a position along a dimension of the multidimensional dataset at which a data value exists in the multidimensional dataset. The index values in the sets of index values are organized in an order. In addition, the medium comprises instructions that cause the processor to calculate sets of offset values that contain offset values for respective ones of the sets of index values. Each of the offset values represents a difference between a current index value in one of the sets of index values and a preceding index value in the set of index values. The preceding index value immediately precedes the current index value according to the order of the set of index values, if such immediately preceding index value exists. Furthermore, the instructions cause the processor to apply a lossless compression algorithm to the sets of offset values to generate a compressed version of the multidimensional dataset. In addition, the instructions cause the processor to output the compressed version of the multidimensional dataset.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
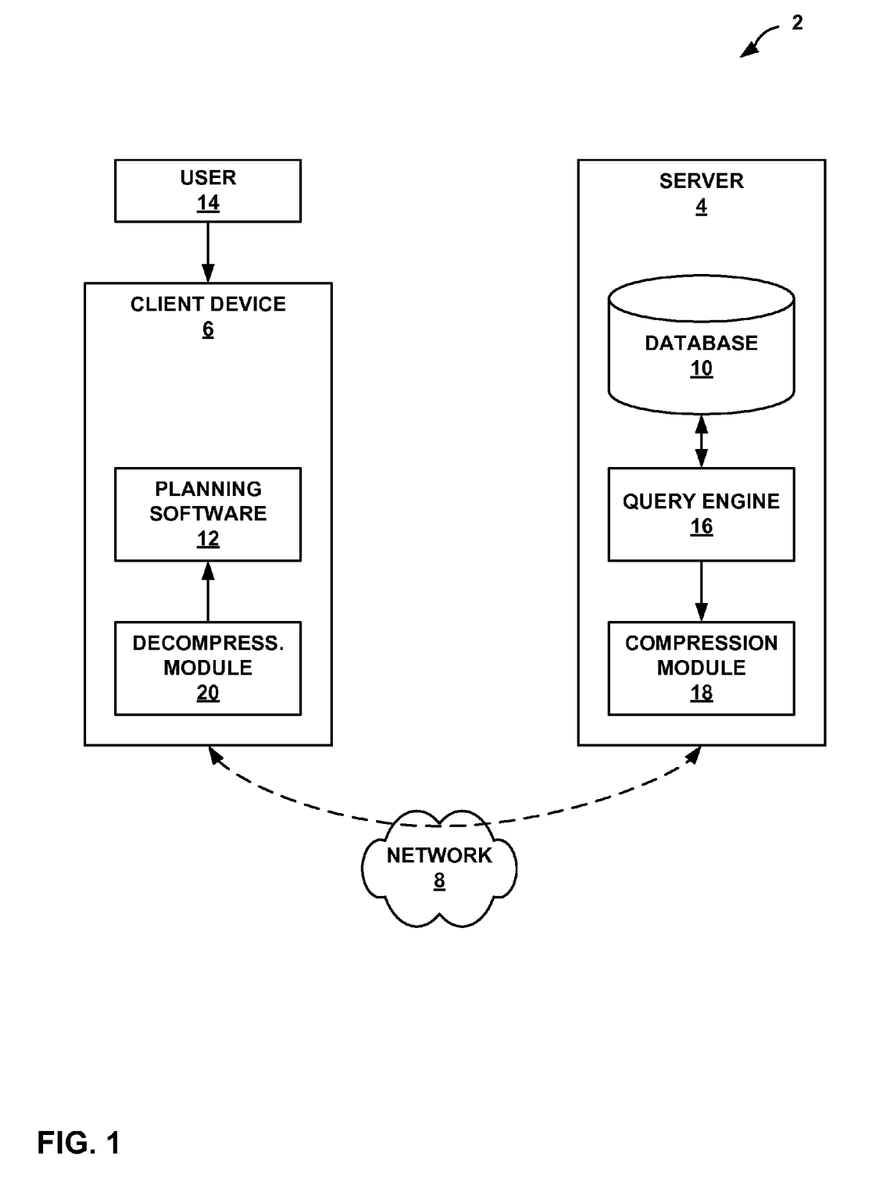
FIG. 1 is a block diagram illustrating an exemplary system in which a server provides compressed multidimensional datasets to a client.

FIG. 1 is a block diagram illustrating an exemplary system 2 in which a server 4 provides compressed multidimensional datasets to a client device 6. Server 4 and client device 6 may communicate by means of a network 8. Network 8 may be a local area network (LAN), metropolitan area network (MAN), wide area network (WAN), the Internet, or otherwise.

As illustrated in the example of FIG. 1, server 4 includes a database 10. Database 10 may contain one or more multidimensional datasets having a plurality of multidimensional data elements. Typically, user 14 views and manipulates multidimensional data of database 10 via client device 6. The data is "multidimensional" in that each multidimensional data element is defined by a plurality of different object types, where each object is associated with a different dimension. User 14 may, for example, enter data related to store sales by entering a name of the salesperson a store identifier, a date, and a product sold, as well as, the price at which the product was sold, into planning software 12. In this example, a four-dimensional data element may comprise objects of type "Name," "Store," "Date," and "Product," where each of the types represent a dimension and the data stored to each object represents a value along each respective dimension. The multidimensional data element may also be associated with other relevant data. In the above example, an element may be further associated with a "Price" measure, which indicates the price paid by the person with the identified name for the identified product at the identified store on the identified date.

In one embodiment, database 10 stores the multidimensional data in the form of one or more B-Trees. For instance, server 4 may determine multidimensional tuples associated with the multidimensional data space. Each multidimensional tuple represents a unique respective multidimensional element with the multidimensional data space. To facilitate this standardization process in these embodiments, client device 6 may maintain data dictionaries that store the mappings between object values and identifiers, or references. For example, client device 6 and server 4 may represent names as unique integer identifiers, e.g., the name "Fred" is represented by name identifier "1," and product names also as unique integer identifiers, e.g., a product named "mat" is represented by product name identifier "4."

Each identifier may be viewed as an index into a respective dimension within the multidimensional data space. An individual multidimensional data element in the dataset may be identified by providing a dimension index value for each of the dimensions of the dataset. For example, a data element of a two-dimensional dataset can be identified by providing a tuple specifying two indices along the two dimensions. That is, a data element may be identified by stating that the element lies at dimension index value i in the first dimension and dimension index value j in the second dimension. This data element may also be denoted $A_{i,j}$.

A business organization may store enterprise data in a multidimensional dataset in database 10. For example, suppose an enterprise has eight customers, sells ten products, and sells the products over six days at varying prices. In this case, a first dimension of a dataset A may describe customers of the enterprise, a second dimension of dataset A may describe products, and a third dimension of dataset A may describe time. Because dataset A contain eight units in the first dimension, ten units in the second dimension, and six units in the third dimension, dataset A may be an 8×10×6 matrix. Data in individual multidimensional data elements of dataset A may reflect a price paid by a customer for a product at a certain time. If customer "5" purchased product "3" on day "2" for $50, the enterprise may record this purchase by entering "$50" in multidimensional data element $A_{5,3,2}$.

As a result, a multidimensional dataset that stores enterprise data may be a "sparse dataset." A sparse dataset is a dataset in which most of the multidimensional data elements do not contain data or only contain default data (e.g., zero, false, etc.). That is, there is a very low probability of having all or even most of the millions of combinations in the n-dimensional space. Moreover, enterprise transactions may be clustered together within the dataset. For example, an 8×10×6 matrix contains 480 multidimensional data elements. If customer "5" was the only customer to make a purchase and customer "5" only bought product "3" on day "2", only one multidimensional data element out of 480 multidimensional data elements in the dataset contains non-default data. All 479 multidimensional data elements other than multidimensional data element $A_{5,3,2}$ contain default or NULL data.

Client device 6 may include enterprise planning software 12. A user 14 may interact with enterprise planning software 12 to evaluate enterprise performance, make predictions, view reports, and so on. Enterprise planning software 12 may use enterprise data in a multidimensional dataset of database 10. For instance, enterprise planning software 12 may send a query to a query engine 16 in server 4. Query engine 16 may parse the query from enterprise planning software 12 and extract a multidimensional subset of the multidimensional dataset of database 10. Subsets of the multidimensional dataset of database 10 returned in response to a query may be referred to herein as "result sets." For example, enterprise planning software 12 may send a query to query engine 16 for all sales data that has happened in the last year on Tuesdays. In response to this query, query engine 16 may extract a result set that contains only the sales data that has happened in the last year on Tuesdays. For instance, in a three-dimensional dataset, one could visualize query engine 16 as taking slices out of a cube (i.e., the three-dimensional dataset). Each of the slices may represent sales data for a Tuesday. By splicing the slices together, query engine 16 derives a new, smaller cube (i.e., a three-dimensional result set).

Despite the fact that a result set may be smaller than an original dataset, the result set may still be very large. Because it may be costly or time consuming to transfer a large result set through network 8, query engine 16 may provide the result set to a compression module 18. In the example of FIG. 1, compression module 18 is shown as a separate module for purposes of explanation and may, in fact, be a part of query engine 16, some other unit in client device 6 or server 4, or otherwise.

In this example, compression module 18 may perform a compression process on a result set so that server 4 may more efficiently transmit the result set through network 8 to client 6. For example, compression module 4 may begin a compression process by identifying a well-ordered list of dimension index values for each dimension of the result set. Each of the dimension index values in the list for a dimension of the result set identifies a position along the dimension of the result set at which a data value exists in the result set. For instance, if data values exist in the result set at positions "2", "9", "16", and "23" in one dimension of the result set, compression module 18 may identify the list {2, 9, 16, 23} of dimension index values for the dimension. After identifying a list of dimension index values for a dimension of the result set, compression module 18 may, for each dimension index value in the list, subtract a previous dimension index value from the dimension index value to obtain a list of offset values for the dimension. Continuing the previous example, compression module 18 may obtain the list of offset values {2, 7, 7, 7} from the list {2, 9, 16, 23} of dimension index values for the dimension (i.e., 2−0=2, 9−2=7, 16−9=7, 23−16=7). In this way, if a result set has N dimensions compression module 18 identifies N lists of offset values.

Each multidimensional data element in a result set may be associated with a multidimensional data element index value. A multidimensional data element index value may be an ordinal number. For example, suppose a result set A has an x-dimension, a y-dimension, and a z-dimension with eight multidimensional data elements in the x-direction, ten multidimensional data elements in the y-dimension, and six multidimensional data elements in the z-dimension for a total of 480 multidimensional data elements. In this case, the multidimensional data element $A_{1,1,1}$ may be associated with the multidimensional data element index value "1", multidimensional data element $A_{1,1,2}$ may be associated with the multidimensional data element index value "2", and so on until multidimensional data element $A_{8,10,6}$, which may be associated with multidimensional data element index value "480". Compression module 18 may identify a well-ordered list of the multidimensional data element index values of multidimensional data elements in a result set that contain non-default data values. For example, if multidimensional data elements associated with the multidimensional data element index values "4", "16", "17", "18", and "28" contain non-default data values, compression module 18 identifies the list {4, 16, 17, 18, 28}. After identifying the list of multidimensional data element index values associated with multidimensional data elements that contain non-default data values, compression module 18 may, for each multidimensional data element index value in the list, subtract a previous multidimensional data element index value in the list from the multidimensional data element index value to obtain a list of offset values. Continuing the previous example, compression module 18 obtains the list of offset values {4, 12, 1, 1, 10} from the list {4, 16, 17, 18, 28} of multidimensional data elements index values of multidimensional data elements that contain non-default data values (i.e., 4−0=4, 16−4=12, 17−16=1, 18−17=1, 28−18=10).

Compression module 18 may generate a data dictionary that contains a one-to-one mapping in which unique numerical data identifiers are associated with each unique data value in the result set. For example, data values in each multidimensional data element may represent a price paid. In this case, a first multidimensional data element may contain the data value "$15", a second multidimensional data element may contain the data value "$10", and a third multidimensional data element may contain the data value "$15". In this example, compression module 18 may assign the data identifier "1" to the price $15 and the data identifier "2" to the price $10. In this exemplary embodiment, compression module 18 would not assign a different data identifier to the data value "$15" in the third multidimensional data element because the data value "$15" is present in the first multidimensional data element.

Once compression module 18 generates a data dictionary, compression module 18 may identify a list of data identifiers of multidimensional data elements containing non-default data. The list of data identifiers may be ordered according to multidimensional data element index value of the multidimensional data elements. For example, suppose multidimensional data elements associated with multidimensional data element index values "4", "16", "17", "18", and "28" have data identifiers "1", "2", "2", "2", and "7", respectively. In this case, compression module 18 may identify the list of data identifiers {1, 2, 2, 2, 7}. After identifying the list of data identifiers, compression module 18 may, for each numerical identifier in the list, subtract a previous numerical identifier from the numerical identifier to identify a list of offset values. Continuing the previous example, compression module identifies the list of offset values {1, 1, 0, 0, 5} from the list {1, 2, 2, 2, 7} of data identifiers (i.e., 1−0=1, 2−1=1, 2−2=0, 2−2=0, 7−2=5).

Eventually, compression module 18 may identify one list of offset values for each dimension of a result set, a list of offset values for multidimensional data elements in the result set that contain non-default data, a list of offset values for numerical identifiers of the data, and a data dictionary.

Compression module 18 may perform a compression algorithm on the data dictionary and each of the lists of offset values individually or together. In this way, compression module 18 may generate a compressed version of a multidimensional dataset that includes a compressed data dictionary and compressed lists of offset values. For example, compression module 18 may use a lossless algorithm that takes advantage of statistical redundancies in the offset values. Examples of publicly available lossless compression algorithms include Run-Length Encoding (RLE), Huffman coding, Lempel-Ziv, DEFLATE, Lempel-Ziv-Welch, Lempel-Ziv-Renau, LZX, LZO, bzip2, arithmetic coding, PAQ and so on.

Each of the lists of offset values may tend to have repeating data. For instance, the list of offset values {2, 7, 7, 7}, used in an example above, contains repeating sevens. Repeating offset values may occur frequently in enterprise data because queries on enterprise data may relate to enterprise events may occur at regular intervals (e.g., once a week). Lossless compression algorithms, such as those described above, tend achieve high compression results on data that contains repeating data.

After compression module 18 generates compressed lists of offset values, compression module 18 may output the compressed version of the multidimensional dataset. For example, compression module 18 may output the compressed version of the multidimensional dataset by transmitting the compressed lists of offset values and the data dictionary to client device 6 through network 8.

When client device 6 receives a compressed version of a multidimensional dataset, decompression module 20 in client device 6 may decompress the multidimensional dataset prior to storage or dynamically upon request by planning software 12. For example, decompression module 20 may apply a decompression algorithm analogous to the compression algorithm used by compression module 18. Decompression module 20 may then, for each list of offset values, add each offset value with the sum of previous offset values in the list to calculate an original list of values. For example, for the list of offset values {1, 1, 0, 0, 5}, decompression module 20 calculates the list {1, 2, 2, 2, 7} (i.e., 1+0=1, 1+1+0=2, 0+1+1+0=2, 0+0+1+1+0=2, 5+0+0+1+1+0=7). After calculating original lists of values, decompression module 20 may fill in the result set using the data dictionary. For instance, if a multidimensional data element at multidimensional data element index value "7" has a data identifier "2", decompression module 20 may look up data identifier "2" in the data dictionary to learn that data identifier "2" is associated with a data value "$10." Decompression module 20 may then substitute "$10" into the result set at the multidimensional data element associated with multidimensional data element index value "7". After filling in the result set with data values, decompression module 20 may provide the decompressed multidimensional dataset to enterprise planning software 12.

This invention may provide one or more advantages. For example, lists of offset values computed form index values into the multidimensional space may contain more repetition than the index values. This may be especially true in the case of enterprise data or data that occurs in clusters in a sparse n-dimensional data space. Because known compression algorithms may use statistical redundancy to compress data, these algorithms may achieve higher compression rates when they are provided with highly repetitive data. This may reduce the amount of resources devoted to storing or transmitting the multidimensional dataset.

As an example of another potential advantage, a typical offset value may be less than a typical index value. Consequently, it may require fewer bytes to store an offset value. For instance, suppose a first dimension index value was 257 and a second dimension index value was 258. It would require two bytes to store the number "257" (i.e., 00000001 00000001) and two bytes to store the number "258" (i.e., 00000001 00000010). However, the offset between 257 and 258 is simply "1". The number "1" may be stored in one byte (i.e., 00000001). Furthermore, the use of a data dictionary may eliminate the need to send a data value through a network more than once. This may further reduce the amount of data that needs to be transmitted.

Figure 2:
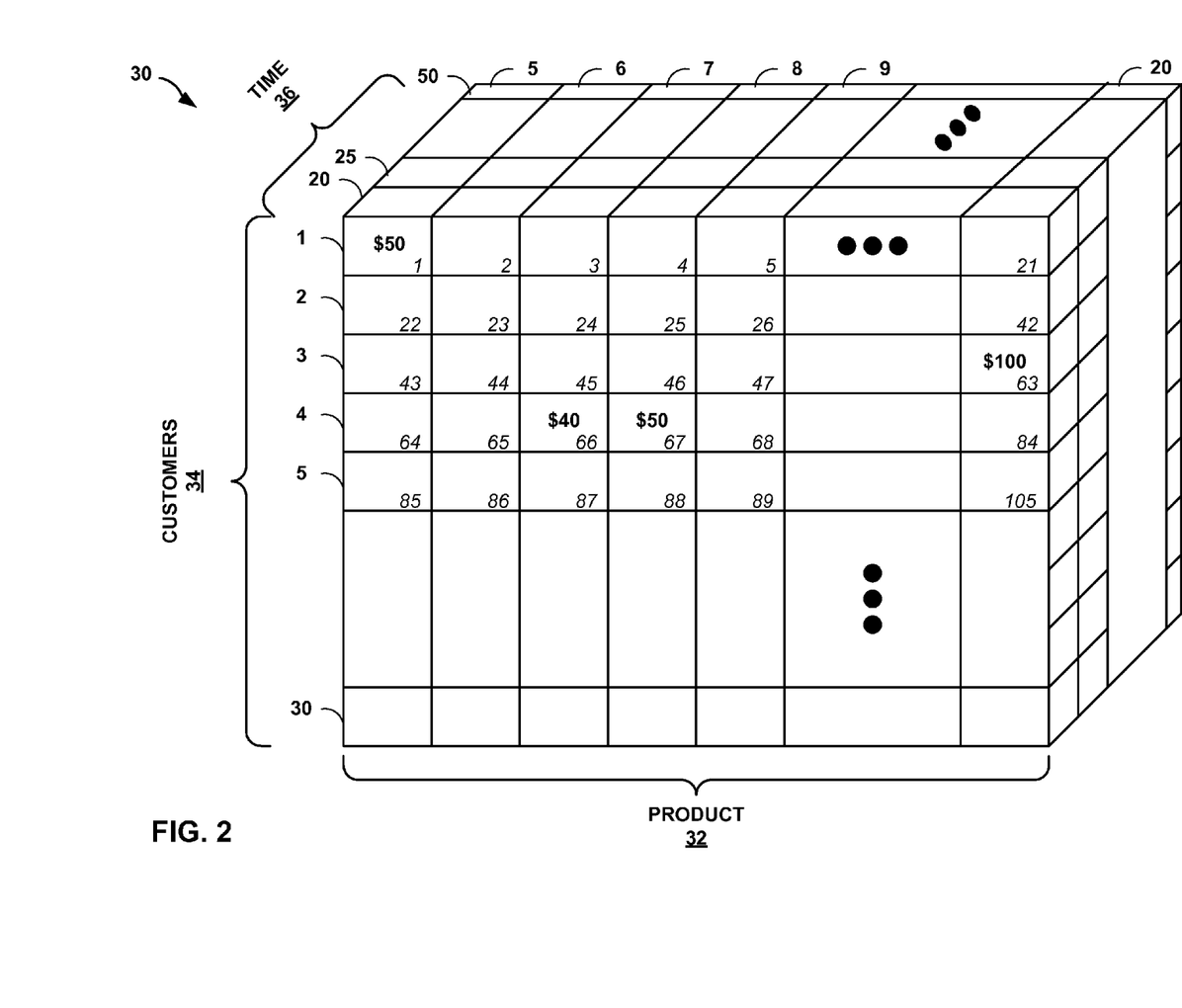
FIG. 2 illustrates an exemplary multidimensional dataset.

FIG. 2 illustrates an exemplary multidimensional dataset. In the example of FIG. 2, a result set 30 has three dimensions: a product dimension 32, a customer dimension 34, and a time dimension 36. In the product dimension, multidimensional data elements have dimension index values 32A through 32N. In product dimension 32, multidimensional data elements have dimension index values 5, 6, 7, 8, 9, . . . 20. In customer dimension 34, multidimensional data elements have dimension index values 1, 2, 3, 4, 5, . . . 30. In time dimension 36, multidimensional data elements have dimension index values 20, 25, . . . 50. A multidimensional data element may be identified by describing its dimension index values in each of the dimensions. For example, the multidimensional data element having dimension index value "5" in product dimension 32, dimension index value "30" in customer dimension 34, and dimension index value "20" in time dimension 36 is the multidimensional data element in the lower left-hand corner of result set 30, as illustrated in the example of FIG. 2. This multidimensional data element may be denoted $A_{5,30,20}$.

Each multidimensional data element in result set 30 is associated with a unique multidimensional data element index value. As illustrated in the example of FIG. 2, multidimensional data element index values are italicized. For instance, multidimensional data element $A_{5,1,20}$ is associated with multidimensional data element index value "1", multidimensional data element $A_{6,1,20}$ is associated with multidimensional data element index value "2", and so on.

Multidimensional data elements in result set 30 may contain data values. As illustrated in the example of FIG. 2, data values are in bold. For instance, multidimensional data element $A_{5,1,20}$ (multidimensional data element index value "1") has a data value of $50, multidimensional data element $A_{20,3,20}$ (multidimensional data element index value "63") has a data value of $100, multidimensional data element $A_{7,4,20}$ (multidimensional data element index value "66") has a data value of $40, and multidimensional data element $A_{8,4,20}$ (multidimensional data element index value "67") has a data value $50. In addition, there are multidimensional data elements in result set 30 that do not contain data values. For instance, multidimensional data element $A_{6,1,20}$ (multidimensional data element index value "2") does not contain a data value.

Result set 30 illustrates an exemplary sparse data set that may be highly compressed using the techniques described herein.

Figure 3:
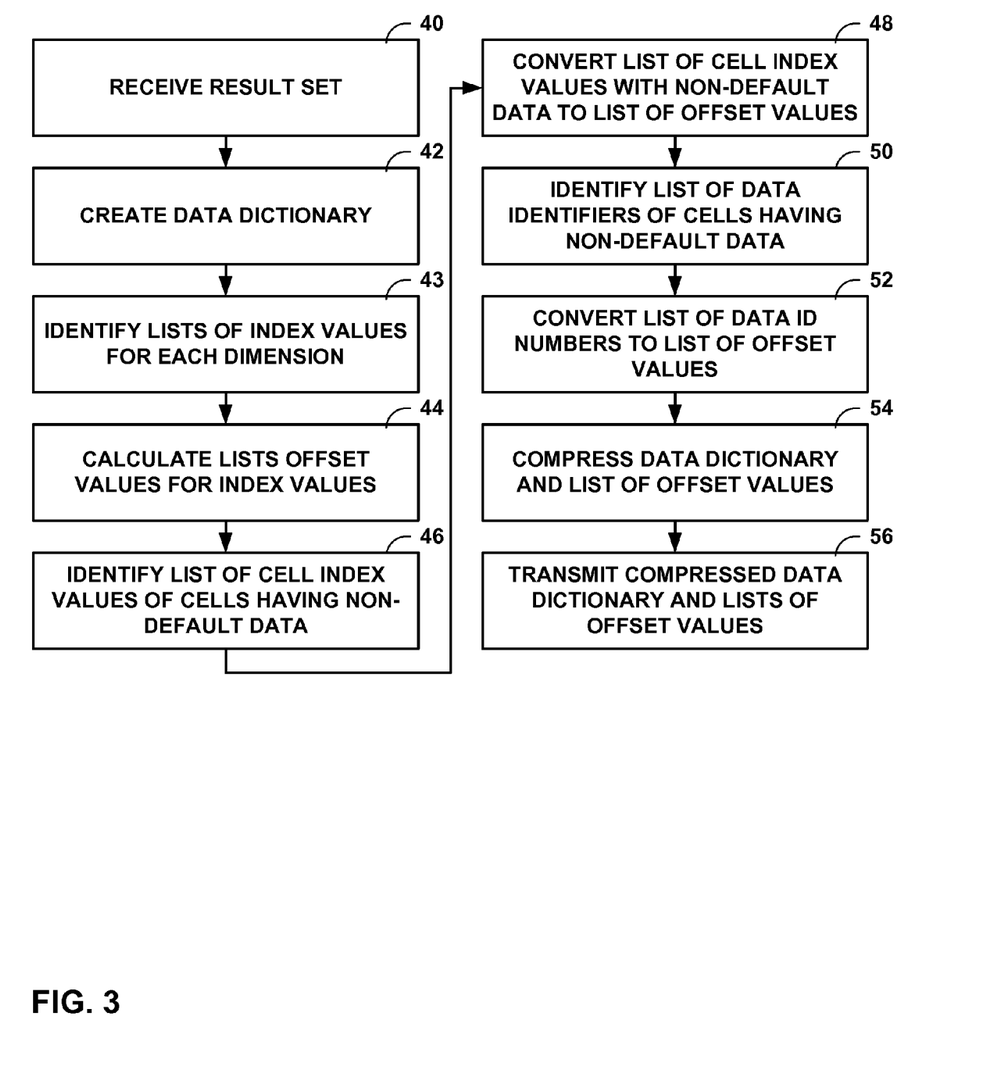
FIG. 3 is a flowchart illustrating exemplary operation of a compression module.

FIG. 3 is a flowchart illustrating an exemplary operation of compression module 18, which may operate on client device 6 or server 4. Initially, compression module 18 receives a multidimensional result set, either from query engine 16 or, if executing on client device 6, from a local cache within client 6 (40). In any event, after receiving the result set, compression module 18 creates a data dictionary that contains mappings between unique numerical data identifiers and unique data values in the result set (42). For example, compression module 18 may map the data identifier "1" to the data value "$50", the data identifier "2" to the data value "$100", the data identifier "3" to the data value "$40", and so on.

Once compression module 18 has generated the data dictionary, compression module 18 computes ordered sets (e.g., lists) of index values for each dimension of the result set (43). Compression module 18 then calculate ordered sets (e.g., lists) of offset values for each of the lists of index values (44). For example, if dimension index values in one dimension are {5, 7, 9, 11, 15}, compression module 18 may calculate the ordered set of offset values {5, 2, 2, 2, 4}.

Compression module 18 then identifies a list of multidimensional data element index values of multidimensional data elements in the result set having non-default data (46). For example, suppose multidimensional data elements having multidimensional data element index values "4", "8", and "10" contain non-default data (e.g., NULL data) and all other multidimensional data elements contain default data. In this case, compression module 18 may identify the list {4, 8, 10}. After identifying the ordered set of multidimensional data element index values, compression module 18 may calculate an ordered set of offset values for the list of multidimensional data element index values (48). Continuing the previous example, compression module 18 may calculate the list of offset values {4, 4, 2} for the list of multidimensional data element index values {4, 8, 10}.

After calculating the list of offset values for the list of multidimensional data element index values, compression module 18 identifies a list of data identifiers of multidimensional data elements in the result set having non-default data (50). For example, the multidimensional data element having index value "1" may contain the data value "$50" which may be mapped to the data identifier "1", the data element having index value "63" may contain the data value "$100" which may be mapped to the data identifier "2", the data element having index value "66" may contain the data value "$40" which is mapped to the data identifier "3", and the data element having index value "67" may contain the data value "$50" which is mapped to the data identifier "1". All other multidimensional data elements in the result set may contain default data (e.g., NULL data or are simply not present in the B-Tree). In this case, compression module 18 identifies {1, 2, 3, 1} as the list of data identifiers of multidimensional data elements in the result set having non-default data. After identifying the list of data identifiers, compression module 18 may calculate a list of offset values for the list of data identifiers (52). Continuing the previous example, compression module 18 may calculate the list of offset values {1, 1, 1, −2} for the list of data identifiers {1, 2, 3, 1}.

At this stage, compression module 18 may compress the data dictionary and the lists of offset values using a lossless compression algorithm to generate a compressed version of the result set (54). For example, compression module 18 may perform the compression on a concatenation of the data dictionary and the lists of offset values, on the data dictionary and each of the lists of offset values individually, or otherwise. After compressing the data dictionary and the lists of offset values, compression module 18 may output the compressed version of the result set (56).

Figure 4:
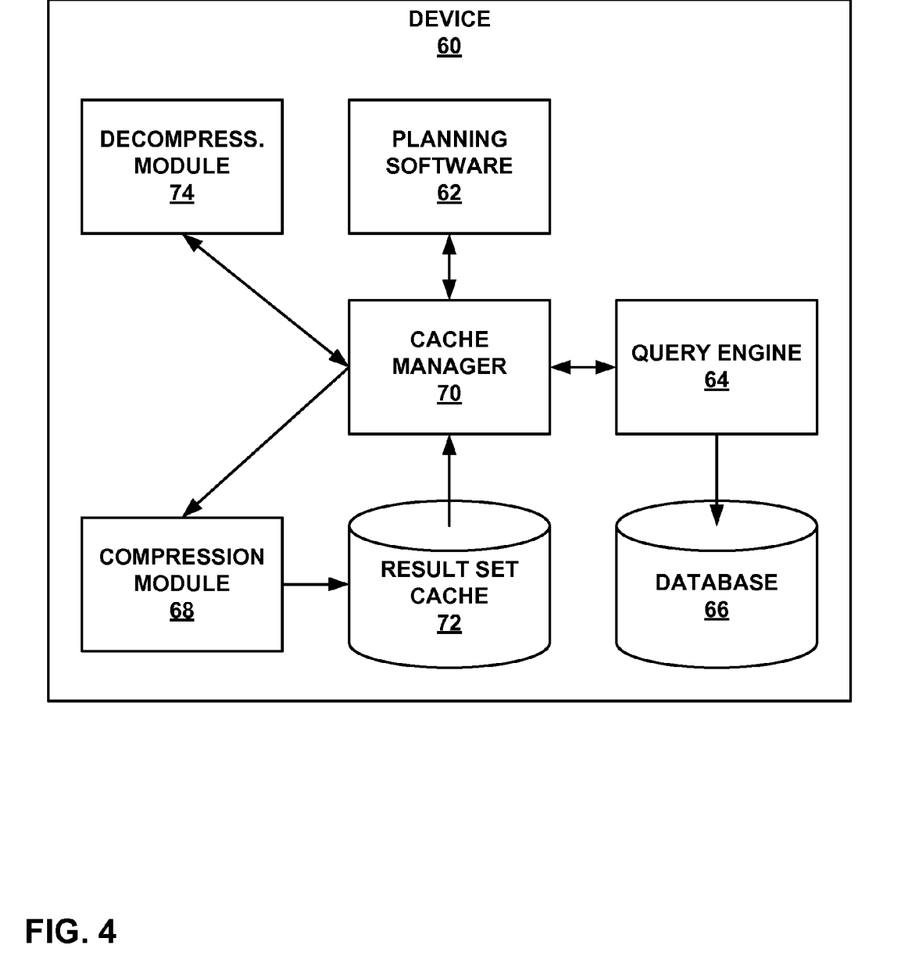
FIG. 4 is a block diagram illustrating an alternate device that may provide one or more embodiments of the invention.

FIG. 4 is a block diagram illustrating an alternate device that may provide one or more embodiments of the invention. Device 60 may, for example, represent a client device on which a compression module 68 utilizes the techniques herein to locally cache multidimensional data in compressed form. As illustrated in the example of FIG. 4, a device 60 comprises several components including planning software 62, a query engine 64, a database 66, a compression module 68, a cache manager 70, a result set cache 72, and a decompression module 74.

A user of device 60 may interact with enterprise planning software 62 to perform one or more enterprise planning activities. To perform the enterprise planning activities, enterprise planning software 62 may generate multiple queries for multidimensional data stored in database 66.

When planning software 62 generates a query, cache manager 70 determines whether result set cache 72 includes at least a partial subset of the data that satisfies the query. If result set cache 72 does not include a partial subset of the data that satisfies the query, cache manager 70 forwards the query to query engine 64. Query engine 64 retrieves a result set from database 66 in response to the query and returns the result set to cache manager 70. Cache manager 70 may then provide the result set to planning software 64 and to compression module 68. Planning software 62 may then use the result set to perform enterprise planning activities. Compression module 68 may perform a compression process similar to the compression process described above in regard to the example of FIG. 3. However, after compressing a result set, compression module 68 may store the compressed result set to result set cache 72. Because the result set is in a compressed form, result set cache 72 may be able to economically store cached compressed result sets. Furthermore, in compressing the first set of lists of offset values, compression module 68 replaces strings of repeating offsets with symbols. For example, compression module 68 may replace a string of one hundred consecutive "1"s with the symbol "×5". Thus, the list of offset values {70, 1, 1, 1, . . . , 1}, where there are one hundred consecutive "1"s may be replaced with the string "70, ×5."

Subsequently, cache manager 70 may receive a second query from planning software 62. Upon receiving the second query, cache manager 70 may first determine whether result set cache 72 contains some or all of the data that satisfies the second query. For example, cache manager 70 may identify lists of index values for each of the dimensions of the second query. After identifying the lists of index values, cache manager 70 may scan through the first result set as it appears in result set cache 72. While scanning the first result set, cache manager 70 may regard pairs of strings in the first result set as ranges. Continuing the example in the previous paragraph, cache manager 70 may regard the string "70, ×5", where "×5" represents one hundred consecutive "1"s, as a range from 70 to 170. If an index value of the second query is in this range, then the first result set contains at least a partial subset of the second result set.

If cache manager 70 determines that the first result set includes a partial subset of the second result set, cache manager 70 extracts the partial subset from the first result set. Cache manager 70 may then formulate a query for any remaining portion of the second result set that is not in the partial subset from the first result set. Cache manager 70 may forward this query to query engine 64. In response to the query, query engine 64 extracts the remaining portion of the second result set from database 66 and returns the remaining portion of the second result set to cache manager 70. Cache manager 70 may then use decompression module 74 to decompress the partial subset from the first result set. After decompression module 74 decompresses the partial subset, cache manager 70 combines the decompressed partial subset from the first result set with the portion of the second result set returned by query engine 64 to generate the second result set. Cache manager 70 may then output the second result set to planning software 62. Planning software 62 may then display information based on the second result set. In addition, cache manager 70 may provide the portion of the second result set returned by query engine 64 to compression module 68 for inclusion in result set cache 66.

Figure 5:
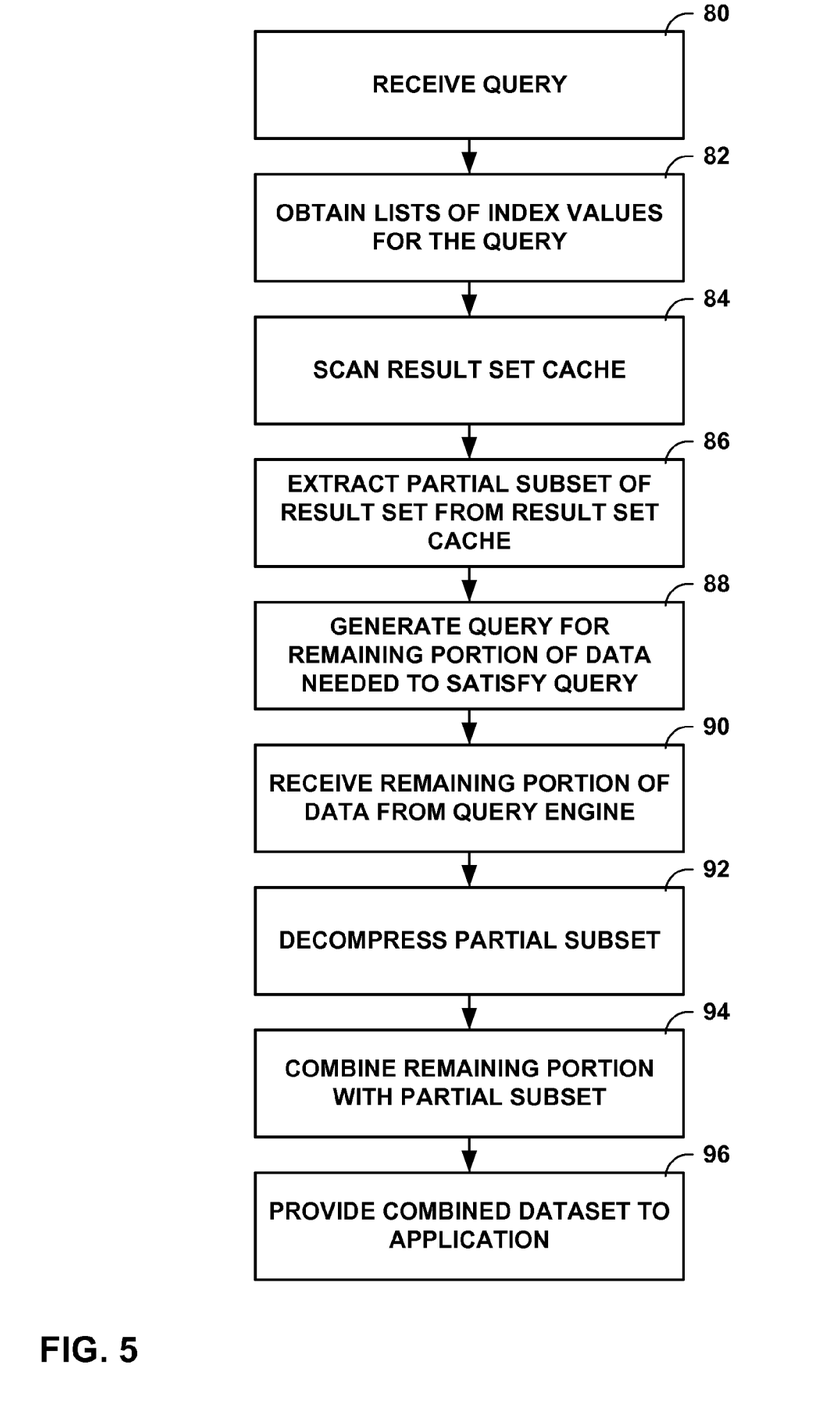
FIG. 5 is a flowchart illustrating an exemplary operation of a cache manager in a device.

FIG. 5 is a flowchart illustrating an exemplary operation of cache manager 70 in device 60. Initially, cache manager 70 receives a query from planning software 62 (80). Cache manager 70 may then identify lists of index values that satisfy the query (82). After obtaining the lists of index values, cache manager 70 may scan result set cache 72 to determine whether a result set in result set cache 72 includes a partial subset of the data that satisfies the query (84). For instance, cache manager 70 may determine whether index values that satisfy the query are within ranges of data in result set cache 72. After scanning result set cache 72, cache manager 70 extracts a partial subset of the data that satisfies the query (86). This partial subset may include some, all, or none of the data that satisfies the query. In other words, the partial subset represents the intersection of the data that satisfies the query and the data in result set cache 72.

Once cache manager 70 has extracted the partial subset from result set cache 72, cache manager 70 may generate a new query for the remaining portion of the data that satisfies the query (88). In other words, data that satisfies the new query is the data that satisfies the original query that is not in the intersection of the data that satisfies the original query and the data in result set cache 72. Subsequently, cache manager 70 may receive the data that satisfies the new query from query engine 64 (90). Cache manager 70 may then decompress the data in the partial subset (92). After the data in the partial subset is decompressed, cache manager 70 combines the data in the partial subset with the data that satisfies the new query (94). The result of this combination is the data that satisfies the original query. Cache manager 70 may then provide the data that satisfies the original query to planning software 62 (96).

Various embodiments of the invention have been described. These and other embodiments are within the scope of the following claims.

The invention claimed is:

1. A method comprising:

determining, by a computing device, ordered sets of index values, wherein each of the index values identifies a position along one of a plurality of dimensions of a multidimensional dataset at which a data value exists in the multidimensional dataset, wherein each of the ordered sets of index values corresponds to a different one of the plurality of dimensions;

calculating, by the computing device, sets of respective offset values for the ordered sets of index values, wherein each of the offset values represents a difference between a current index value in one of the sets of index values and a preceding index value in the one of the sets of index values, wherein the preceding index value immediately precedes the current index value according to the order of the one of the sets of index values;

generating a data dictionary that maps unique numerical data identifiers to unique data values in the multidimensional dataset in a one-to-one mapping;

applying a compression algorithm to the sets of offset values and the data dictionary to generate a compressed version of the multidimensional dataset, wherein the compressed version of the multidimensional dataset includes a compressed data dictionary and compressed lists of offset values;

outputting the compressed version of the multidimensional dataset;

constructing a second multidimensional dataset as a result for a received query, wherein constructing the second multidimensional dataset comprises:

identifying a multidimensional subset comprising elements of the first multidimensional dataset that satisfy at least a portion of the query, wherein the multidimensional subset is defined by an intersection of the first multidimensional dataset and the second multidimensional dataset;

extracting the multidimensional subset from the compressed version of the first multidimensional dataset;

applying a decompression algorithm to the multidimensional subset extracted from the compressed version of the first multidimensional dataset;

extracting a remaining portion of the second multidimensional dataset from a database, wherein the remaining portion comprises elements of the query that were not satisfied by the multidimensional subset, wherein the remaining portion is defined by the difference between the second multidimensional dataset and the multidimensional subset; and combining the multidimensional subset and the remaining portion to form the second multidimensional dataset; and outputting the second multidimensional dataset.

2. The method of claim 1, wherein the method further comprises:

obtaining a set of numerical data identifiers, wherein each numerical data identifier in the set of numerical data identifiers is a numerical data identifier of a data value in a multidimensional data element in the multidimensional dataset; and calculating a set of offset values for the set of numerical data identifiers, wherein the set of offset values for the numerical data identifiers contains offset values for the set of numerical data identifiers; and wherein applying a compression algorithm to the data dictionary comprises applying a lossless compression algorithm to the set of offset values that was calculated for the numerical data identifiers.

3. The method of claim 1, wherein the method further comprises:

obtaining a set of multidimensional data element index values, wherein each multidimensional data element index value in the set of multidimensional data element index values is associated with a multidimensional data element in the multidimensional dataset that contains a data value; and calculating a set of offset values for the multidimensional data element index values, wherein the set of offset values for the multidimensional data element index values contains offset values for the set of multidimensional data element index values; and wherein applying a compression algorithm to the data dictionary comprises applying a lossless compression algorithm to the set of offset values for the multidimensional data element index values.

4. The method of claim 1, wherein the compression algorithm comprises one of: Run-Length Encoding (RLE), Huffman encoding, Lempel-Ziv, DEFLATE, Lempel-Ziv-Welch and arithmetic coding.

5. The method of claim 1, wherein outputting the compressed version comprises outputting the compressed version through a computer network.

6. The method of claim 1, wherein the multidimensional dataset includes more than three dimensions.

7. The method of claim 1, wherein the method further comprises:

receiving a query for the multidimensional dataset; and extracting the multidimensional dataset from a superset of multidimensional data in response to the query.

8. The method of claim 7, wherein receiving a query comprises receiving a query from enterprise planning software.

9. A method comprising:

receiving, by a computing device, a compressed version of a first multidimensional dataset comprising:

a compressed data dictionary, wherein the compressed data dictionary includes a data dictionary that maps unique numerical data identifiers to unique data values in the first multidimensional dataset in a one-to-one mapping; and a set of compressed lists of offset values, wherein each of the set of compressed lists of offset values includes differences between an ordered set of index values, wherein each of the index values identifies a position along one of a plurality of dimensions of the first multidimensional dataset at which a data value exists in the first multidimensional dataset, wherein each of the ordered sets of index values corresponds to a different one of the plurality of dimensions, and wherein each of the offset values represents a difference between a current index value in one of the sets of index values and a preceding index value in the one of the sets of index values, wherein the preceding index value immediately precedes the current index value according to the order of the one of the sets of index values;

constructing a second multidimensional dataset as a result for a received query, wherein constructing the second multidimensional dataset comprises:
scanning the first multidimensional dataset to identify a multidimensional subset comprising elements of the first multidimensional dataset that satisfy at least a portion of the query, wherein the multidimensional subset is defined by an intersection of the first multidimensional dataset and the second multidimensional dataset;
extracting the multidimensional subset from the compressed version of the first multidimensional dataset;
applying a decompression algorithm to the multidimensional subset extracted from the compressed version of the first multidimensional dataset;
issuing a command that extracts a remaining portion of the second multidimensional dataset from a database, wherein the remaining portion comprises elements of the query that were not satisfied by the multidimensional subset, wherein the remaining portion is defined by the difference between the second multidimensional dataset and the multidimensional subset;
receiving the remaining portion in response to the command; and
combining the multidimensional subset and the remaining portion to form the second multidimensional dataset; and
outputting the second multidimensional dataset as the result for the query.

10. The method of claim 9, wherein receiving the first multidimensional dataset comprises caching the first multidimensional dataset.

11. A computing device comprising:
a database to store a multidimensional dataset, wherein the multidimensional dataset comprises a plurality of dimensions;
a processor communicatively coupled to the database; and
a compression module executed by the processor to determine ordered sets of index values from the multidimensional dataset of the database, wherein each of the index values identifies a position along one of the plurality of dimensions of the multidimensional dataset at which a data value exists in the multidimensional dataset, wherein each of the ordered sets of index values corresponds to a different one of the plurality of dimensions, to calculate sets of respective offset values for the ordered sets of index values, wherein each of the offset values represents a difference between a current index value in one of the sets of index values and a preceding index value in the one of the sets of index values, wherein the preceding index value immediately precedes the current index value according to the order of the one of the sets of index values, to generate a data dictionary that maps unique numerical data identifiers to unique data values in the multidimensional dataset in a one-to-one mapping, to apply a compression algorithm to the sets of offset values and the data dictionary to generate a compressed version of the multidimensional dataset, wherein the compressed version of the multidimensional dataset includes a compressed data dictionary and compressed lists of offset values, to output the compressed version of the multidimensional dataset,
wherein the processor is configured to construct a second multidimensional dataset as a result for a received query, wherein to construct the second multidimensional dataset, the processor is configured to identify a multidimensional subset comprising elements of the first multidimensional dataset that satisfy at least a portion of the query, wherein the multidimensional subset is defined by an intersection of the first multidimensional dataset and the second multidimensional dataset, extract the multidimensional subset from the compressed version of the first multidimensional dataset, apply a decompression algorithm to the multidimensional subset extracted from the compressed version of the first multidimensional dataset, extract a remaining portion of the second multidimensional dataset from a database, wherein the remaining portion comprises elements of the query that were not satisfied by the multidimensional subset, wherein the remaining portion is defined by the difference between the second multidimensional dataset and the multidimensional subset, and combine the multidimensional subset and the remaining portion to form the second multidimensional dataset, and to output the second multidimensional dataset.

12. The device of claim 11,
wherein the compression module identifies a set of numerical data identifiers, wherein each numerical data identifier in the set of numerical data identifiers is a numerical data identifier of a data value in a multidimensional data element in the multidimensional dataset;
wherein the compression module calculates a set of offset values for the set of numerical data identifiers, wherein the set of offset values for the numerical data identifiers contains offset values for the set of numerical data identifiers; and
wherein, in outputting the compressed version of the multidimensional dataset, the compression module applies a lossless compression algorithm to the set of offset values that was calculated for the set of numerical identifiers.

13. The device of claim 11,
wherein the compression module identifies a set of multidimensional data element index values, wherein each multidimensional data element index value in the set of multidimensional data element index values is associated with a multidimensional data element in the multidimensional dataset that contains a data value;
wherein the compression module calculates a set of offset values for the multidimensional data element index values, wherein the set of offset values for the multidimensional data element index values contains offset values for the list of multidimensional data element index values; and
wherein, in outputting the compressed version of the multidimensional dataset, the compression module applies a lossless compression algorithm to the set of offset values for the multidimensional data element index values.

14. The device of claim 11, wherein the network device further comprises a query engine to extract the multidimensional dataset from a superset of multidimensional data in the database in response to a query.

15. The device of claim 11, wherein the network device further comprises a cache to store the compressed version of the multidimensional dataset.

16. A computer-readable storage medium comprising instructions for causing a programmable processor to:
determine ordered sets of index values, wherein each of the index values identifies a position along one of a plurality of dimensions of a multidimensional dataset at which a data value exists in the multidimensional dataset, wherein each of the ordered sets of index values corresponds to a different one of the plurality of dimensions;
calculate sets of respective offset values for the ordered sets of index values, wherein each of the offset values represents a difference between a current index value in one of the sets of index values and a preceding index value in the one of the sets of index values, wherein the preceding index value immediately precedes the current index value according to the order of the one of the sets of index values;

generate a data dictionary that maps unique numerical data identifiers to unique data values in the multidimensional dataset in a one-to-one mapping;

apply a compression algorithm to the sets of offset values and the data dictionary to generate a compressed version of the multidimensional dataset, wherein the compressed version of the multidimensional dataset includes a compressed data dictionary and compressed lists of offset values;

output the compressed version of the multidimensional dataset;

construct a second multidimensional dataset as a result for a received query, wherein the instructions to construct the second multidimensional dataset comprise instructions to:

identify a multidimensional subset comprising elements of the first multidimensional dataset that satisfy at least a portion of the query, wherein the multidimensional subset is defined by an intersection of the first multidimensional dataset and the second multidimensional dataset;

extract the multidimensional subset from the compressed version of the first multidimensional dataset;

apply a decompression algorithm to the multidimensional subset extracted from the compressed version of the first multidimensional dataset;

extract a remaining portion of the second multidimensional dataset from a database, wherein the remaining portion comprises elements of the query that were not satisfied by the multidimensional subset, wherein the remaining portion is defined by the difference between the second multidimensional dataset and the multidimensional subset; and combine the multidimensional subset and the remaining portion to form the second multidimensional dataset; and output the second multidimensional dataset.

* * * * *